(12) United States Patent
Azvine et al.

(10) Patent No.: US 9,897,987 B2
(45) Date of Patent: Feb. 20, 2018

(54) METHOD AND APPARATUS FOR CONTROLLING A SYSTEM

(71) Applicant: BRITISH TELECOMMUNICATIONS public limited company, London (GB)

(72) Inventors: Behnam Azvine, London (GB); Trevor Philip Martin, Bristol (GB)

(73) Assignee: British Telecommunications PLC, London (GB)

( * ) Notice: Subject to any disclaimer, the term of this patent is extended or adjusted under 35 U.S.C. 154(b) by 681 days.

(21) Appl. No.: 14/386,714

(22) PCT Filed: Mar. 19, 2013

(86) PCT No.: PCT/GB2013/000120
§ 371 (c)(1),
(2) Date: Sep. 19, 2014

(87) PCT Pub. No.: WO2013/140116
PCT Pub. Date: Sep. 26, 2013

(65) Prior Publication Data
US 2015/0051713 A1 Feb. 19, 2015

(30) Foreign Application Priority Data
Mar. 19, 2012 (EP) .................... 12250063

(51) Int. Cl.
*G06K 9/00* (2006.01)
*H04H 60/45* (2008.01)
*G05B 15/02* (2006.01)

(52) U.S. Cl.
CPC ......... *G05B 15/02* (2013.01); *G06K 9/00335* (2013.01); *G06K 9/00496* (2013.01); *H04H 60/45* (2013.01)

(58) Field of Classification Search
None
See application file for complete search history.

(56) References Cited

U.S. PATENT DOCUMENTS 8,032,409 B1 * 10/2011 Mikurak ................ G06Q 10/00
 705/14.39
9,473,814 B1 * 10/2016 Schlack ................ G06Q 30/02
(Continued)

FOREIGN PATENT DOCUMENTS

WO WO 2007/131069 11/2007
WO WO 2007131069 A2 * 11/2007 ............. G06Q 30/02

OTHER PUBLICATIONS

Miika Valtonen et al., "Proactive and adaptive fuzzy profile control for mobile phones", Pervasive Computing and Communications, 2009, Percom 2009, IEEE International Conference on, IEEE, Piscataway, NJ, Mar. 9, 2009, pp. 1-3.
(Continued)

*Primary Examiner* — Isaac T Tecklu
(74) *Attorney, Agent, or Firm* — Nixon & Vanderhye PC (57) ABSTRACT

A system controller (20, 100, 30, 40) comprises a receiver (20) for receiving data about a system (10, 11) to be controlled and for associating the received data with a time factor; a summarizer (100) for updating a set of summary bins, each of which covers a respective period of time, and each of which stores a summary of the received data having a time factor which falls within the respective period of time covered by the summary bin; a processor (30) for, processing the summary bins, for example in order to categorize an unknown entity (5) (such as a human user) interacting with the system under control (10, 11) (via a user interface (11) forming part of the system under control) such as into an adult interested in football, etc., and a director (40) for issuing control instructions to the system to be controlled based on the results of the processor (30). The periods of
(Continued)

time covered by respective summary bins include overlapping periods of time and periods of time having different durations and are preferably overlapping, fuzzy, multi-scale bins.

13 Claims, 5 Drawing Sheets

(56) References Cited

U.S. PATENT DOCUMENTS

| | | | | |
|---|---|---|---|---|
| 2002/0129368 A1* | 9/2002 | Schlack | ................ | G06Q 30/02 |
| | | | | 725/46 |
| 2003/0101449 A1* | 5/2003 | Bentolila | ........... | G06Q 30/0251 |
| | | | | 725/10 |
| 2006/0048189 A1* | 3/2006 | Park | ........................ | G06F 3/013 |
| | | | | 725/46 |
| 2012/0233267 A1* | 9/2012 | Miner | .................... | H04L 51/14 |
| | | | | 709/206 |
| 2013/0275528 A1* | 10/2013 | Miner | .................... | H04L 51/18 |
| | | | | 709/206 |

OTHER PUBLICATIONS

International Search Report for PCT/GB2013/000120, dated Jun. 10, 2013.

\* cited by examiner

METHOD AND APPARATUS FOR CONTROLLING A SYSTEM

This application is the U.S. national phase of International Application No. PCT/GB2013/000120, filed 19 Mar. 2013, which designated the U.S. and claims priority to EP Application No. 12250063.0, filed 19 Mar. 2012, the entire contents of each of which are hereby incorporated by reference.

TECHNICAL FIELD

The present invention relates to a method and apparatus for controlling a system, and in particular to a method and apparatus for controlling a computer system, or similar apparatus, by receiving a large amount of data, processing that data in order to produce a useful summary of the data, processing the summarised data and then controlling the system based on the results of processing the summarised data, using novel and useful techniques for producing the summarised data.

BACKGROUND AND SUMMARY

There are many systems in which data is generated by an unknown entity (e.g. a human user) and it would be useful to be able to categorise the entity (e.g. to categorise the user as a child or as an adult) in Order to modify the behaviour of a system with which the unknown entity (e.g. a user) is interacting accordingly (e.g. to provide a simpler user interface to children than to adults, etc.). This is typically done by asking the user/entity for identity information (e.g. asking the user to "log on" to the system). However there may be circumstances where it is preferable to perform the categorisation required for a particular purpose without requesting the information directly from the user (one such example being where the user is not trusted to provide his/her log on credentials honestly, although more normal situations are likely to be just for the user's convenience, where the user interface does not permit a normal typed log-in procedure, or for users or other entities which are not able or willing generally to provide suitable credentials for logging on purposes, or where a group of individuals is involved and all that is required is a categorisation of the group and it would be tedious to determine this by requesting log-on info from each individual and/or still difficult to determine the group correctly even if all of the individuals were known).

There are also many systems which generate lots of data which could be useful for tasks such as identifying a category to which a user of the system belongs, etc. but is too voluminous to be efficiently transmitted and/or stored for subsequent processing and is also possibly too voluminous to be efficiently processed (even if it could be suitably stored and/or transmitted) Known mechanisms for summarising data include attempting to fit the data to a particular well known mathematical distribution (e.g. data which conforms to a normal distribution can be very efficiently summarised by noting details such as the number of data elements (or data points) and the mean and standard deviation of the collection of data. Similar calculations can be performed for a collection of data items corresponding to any other of several well known distributions (e.g. uniform, Poisson, etc.). Another method is to divide time into a series of intervals or "bins" and to count the occurrence of events (by type) and storing the total counts for each recorded event type within a particular bin (i.e. occurring within a particular duration of time corresponding to the bin). (E.g. if storing data about the behaviour of a Digital Subscriber Line, information about the occurrence of forward error corrections, errored seconds and resynchronisations might be summarised and stored as a series of groups of four numbers—e.g. (1251, 230, 10, 0)—i.e. bin No. 1251, 230 forward error corrections, 10 errored seconds and 0 resynchronisations which could be stored in a relational database table).

US2002/0129368 describes a method of profiling a television viewer based on the interactions between each viewer of a television and the television, and using the generated profiles to infer, at a particular time, which specific individual or individuals are actually interacting with the television. Data is stored in time bins and is moved from one bin to another as time passes. The bins include different bins of different durations (i.e. covering periods of time of different lengths). Also sliding windows covering a number of small bins are described. However there is no discussion of the use of fuzzy bins or of how these could be used to produce a multi-scale system in which data is moved only partially from one bin to another.

WO 2007/131069 describes another method of profiling a television viewer based on the interactions between television viewers and a television set, but also describes how fuzzy logic can be used to help to categorise a current user as being one of a plurality members of a household (or of being identified as a guest or visitor user who is not a member of the household). However, there is no disclosure of multiple data summary bins wherein the periods of time covered by respective summary bins include overlapping periods of time and periods of time having different durations.

According to a first aspect of the present invention, there is provided a system controller comprising: a receiver for receiving data about a system to be controlled (e.g. data input to the system, data output by the system or intermediate data generated by the system as a result of some processing of input data, etc.) and for associating the received data with a time factor (e.g. a timestamp or a time interval, etc.); a summariser for updating a set of summary bins, each of which is associated with a respective period of time, and each of which stores a summary of the received data associated with its respective period of time; and a processor for processing the summary bins; and a director for issuing control instructions to the system to be controlled based on the results of the processor; wherein the periods of time associated with respective summary bins include overlapping periods of time and periods of time having different durations.

According to an alternative expression of the first aspect of the present invention, there is provided a system controller comprising: a receiver for receiving data about a system to be controlled and for associating the received data with a time factor; a summariser for updating a set of summary bins, each of which covers a respective period of time, and each of which stores a summary of the received data having a time factor which falls within the respective period of time covered by the summary bin; a processor for processing the summary bins; and a director for issuing control instructions to the system to be controlled based on the results of the processor; wherein the periods of time covered by respective summary bins include overlapping periods of time and periods of time having different durations.

Where the time factor associated with received data specifies a duration of time (as opposed to an instant of time), the phrase "each of which [summary bins] stores a summary of the received data having a time factor which falls within the respective period of time covered by the summary bin" is intended to include the possibility that the two durations of time (i.e. that associated with the received data and that covered by the summary bin) are overlapping rather than one being entirely contained within the other as is apparent from the following.

The use of summary bins which are associated with overlapping and non-equal time durations enables a much better summarisation of event data which is difficult to map to a well understood mathematical distribution (e.g. a normal or Poisson distribution etc.) compared to the use of conventional bins of data associated with non-overlapping equal time durations. Preferably, the bins are also fuzzy bins in the sense that an event may partially belong to a particular time duration (rather than crisply either belonging to a particular duration or not). For example a fuzzy bin of one hour's duration storing the most recent events might ascribe events occurring at a present time (of to) a membership of 1 with events which have occurred up to one hour preceding the present time being given a membership of between 1 and zero according to a linear relationship moving between 1 and 0 between the present time and one hour preceding the present time, such that, for example, an event which occurred 30 minutes prior to the present time would be ascribed a membership value of 0.5 to the fuzzy bin associated with the most recent duration (see FIG. 3 described below). Such bins (i.e. fuzzy bins associated with overlapping, non-equal time durations) are hereinafter referred to as overlapping, fuzzy, multi-scale bins.

Thus, the summary bins are preferably fuzzy bins in the sense that where bins, having the same granularity, cover overlapping periods of time, data associated with a time falling within such an overlap is apportioned between the overlapping summary bins for summarising purposes in accordance with fuzzy membership rules as discussed above. Preferably the total membership of an event at a specified instant of time to two or more fuzzy bins of the same granularity will be one; for example, following on from the example given above, it is preferable if, as membership of the fuzzy bin which stores the most recent events as described above falls linearly from one to zero as time proceeds from the present time to a time one hour in the past, that a second bin has a membership which increases from zero to one during this same period, such that the total membership to these two bins is one for all times between the present time and one hour in the past, with the apportionment between the bins varying across this period from being wholly apportioned to the first bin at the present time to being wholly apportioned to the second bin at one hour in the past.

An alternative manner of specifying fuzzy overlapping multi-scale bins is to associate a few (e.g. four to eight) one hour bins each with a fixed one hour period, for example from 17:30 hours to 18:30 hours, 16:30 to 17:30, etc. such that full membership (of one) to a single one hour bin is ascribed only to events occurring exactly on the hour (e.g. at 18:00 hours) with a linearly increasing membership level between zero and one for events occurring at times between one hour before the hour in question (e.g. from 17:00 hours to 18:00 hours) and a decreasing membership between one and zero for events occurring between the hour in question and one hour later (e.g. from 18.00 hours to 19:00 hours), such that any event occurring at any time will be ascribed a total membership of 1 between two adjacent bins (apart from events occurring exactly on the hour); for example, an event occurring at 18:30 would be ascribed 0.5 membership to the 17:30-18:30 bin and 0.5 membership to the 18:30-19:30 bin; and an event occurring at 18:15 would be ascribed 0.75 membership to the 17:30-18:30 bin and 0.25 to the 18:30-19:30 bin. In this arrangement, when time has passed sufficiently that a bin associated with a relatively short scale time duration (e.g. a one hour bin) is associated with a time period (e.g. 15:30-16:30) which is more than a predetermined length of time in the past (e.g. more than say four hours in the past), it may be assimilated (or number of such fine grain bins may be amalgamated) into a larger scale bin (e.g. after say 19:00 hours the 15:30-16:30 bin may be assimilated into a four hour bin associated with say 12:30-16:30)—this process may be performed as a batch process at intervals related to the duration of the larger scale bin—e.g. after say 19:00 hours four one hour bins (e.g. 12:30-13:30, 13:30-14:30, 14:30-15:30 and 15:30-16:30) may be assimilated/amalgamated at that time to become a new four hour 12:30-16:30 bin, with the next assimilation/amalgamation of four one hour bins 16:30-17:30, . . . , 19:30-20:30 not occurring until after 23:00, etc.). A similar process may be occurring at the next scale—e.g. on an approximate daily basis, groups of six four hour periods may be assimilated into a one day bin, etc.

Preferably, the summariser generates from the received data one or more attribute values and stores these as the summary of the data. Each generated attribute value preferably depends upon the existing value for a particular attribute (which may be null or zero if no "relevant" data has previously been received—where "relevant" here means both that it pertains to the attribute in question and pertains to the time period covered at least partially by the summary bin in question) as well as the received data.

Preferably, the content of each bin is updated from time-to-time (e.g. on a periodic basis or, more preferably on an event driven basis such as whenever a new event which will have an effect on the content of at least one bin is detected—refinements on this may include buffering a predetermined number of events (or the events occurring—or commencing or ending—within a predetermined period of time) and then performing an update based on the contents of the buffer when the buffer is read at a predetermined time (e.g. because the buffer period of time has expired or the buffer is full or has reached a trigger capacity, etc.). When an update is performed it is preferable if all of the bins are also updated at that time. Updating the bins preferably includes ascertaining a portion of one or more bins to be transferred to one or more other bins as well as ascertaining the additional new contents to be added to new bins based on newly detected events/acquired data. In some embodiments, updating bins may additionally involve ascertaining the proportion of the contents of one or more old bins to now be discarded as a result of the contents being associated with data/events which are now so old as to not be relevant to any of the stored bins.

Preferably, transferring some portion of the contents of one bin into another is just a matter of transferring the complete contents from a bin of one scale to a bin of another larger scale/coarser granularity (or possibly sharing the contents of one bin between two adjacent and overlapping coarser grain bins). Alternatively, each time a new event is recorded, the time period with which a bin is associated may be changed (in absolute terms because the bins may be associated with a period of time specified in relation to a time which is changing absolutely—e.g. the time periods could be with reference to a current time which is of course constantly changing) and therefore the contents of the bins must be transferred on each such occasion so that the contents transfer over time from more recent to more distant (in time) bins over the course of time. The different possible ways of transferring the contents of one bin to another (either of the same or of a different scale) may result in different contents being assigned to the bins, but so long as whenever a portion of one bin is taken out from that bin, that same amount is transferred into, another bin (or bins) so that no contents are lost), and so long as the amounts ascribed to each bin are approximately similar regardless of the manner employed for performing the transfer, the bins may still be useful for the principal function of performing a categorisation of the generating entity (or entities) responsible for generating the recorded events/acquired data.

By arranging that, in times of overlap between two fuzzy overlapping bins of the same scale, the total membership of an event to the bins sums to 1, it is possible to easily combine the contents (of several adjacent fuzzy overlapping bins to move the contents of two overlapping bins to a different bin (e.g. so as to enable an update of a later bin (of either the same scale as the original bins, or perhaps of a different—e.g. longer duration—scale bin, at a later time—this updating of bins is described in greater detail below).

By associating bins with overlapping non-equal durations of time different levels of detail can be recovered from the bins in respect of different times. In particular, since it is often more useful to have a finer granularity knowledge of recent events than of older events, it is preferable if there are fuzzy bins covering relatively short durations in respect of more recent events and fuzzy bins covering progressively longer durations in respect of less recent events. By using fuzzy, overlapping, multi-scale bins it is possible to avoid the problems associated with fixed duration, crisp, non-overlapping bins that it can be difficult to determine (in respect of certain types of data such as message activity on a social networking web-site) the optimum window size for each bin—too short and the change from window to window (or bin to bin) becomes noisy or chaotic (and therefore less useful for performing automatic categorisation based on the data), too long and interesting changes may be lost in the smoothing inherently involved in the summarisation process (of storing the data as counts within a bin). The use of fuzzy, overlapping multi-scale bins significantly mitigates these problems enabling interesting changes to be detected relatively rapidly (i.e. not smoothed away) whilst avoiding noisy unpredictable results as a result of having bins associated with too short a time scale.

Preferably the processing performed on the summary bins includes identifying a sub-set of the data associated with a single unknown entity (whether an Individual, a group of individuals or one or more computer systems or programs, autonomous agents, software applications, etc.) and performing a categorisation of the data in order to identify a category with which to associate the entity, such that the system to be controlled can then be modified in order to be tailored for future use by the categorised entity in accordance with the categorisation. For example, in a social networking environment, it may be desirable to categorise users by age and gender so that adults can be excluded from interacting with children in a child oriented social networking environment. To achieve this, a standard categoriser (e.g. a neural network) could be trained on summary bins of data derived from a combination of known children and known adults (possibly including adults pretending to be children) and thereafter, fresh data from unknown entities can be summarised into the summary bins and then processed by the now trained standard categoriser which can, based on its training, attempt to categorise the unknown entities accordingly as either children or adults, and an alert can be generated in respect of entities identified as adults attempting to masquerade as children, etc.

Thus, in a preferred embodiment of the present invention, a system controller according to the first aspect of the present invention is provided wherein the received data is data resulting from interactions between an unknown entity and the system to be controlled and wherein the processor is operable to perform a categorisation of the received data in order to identify a category with which to associate the entity, and wherein the director issues instructions to the system to be controlled to modify its behaviour in order to be tailored to the unknown entity in accordance with the categorisation performed by the processor. Furthermore, where the system to be controlled is a social networking platform, each user of the social networking platform can be considered as constituting an unknown entity to be categorised, and the system can preferably be controlled to disable certain functionality for a particular user if the category identified by the processor disagrees with a categorisation provided by the user (e.g. if a user self-identifying as a child is identified as being an adult).

Similarly, a set-top box associated with a television apparatus may tailor its user interface according to whether it determines that a child or an adult is operating the set top box at any given moment in time, or indeed in accordance with a particular individual or group of individuals which it may determine is currently operating the set-top box (or viewing the television, etc.).

A further aspect of the present invention relates to the summariser of the first aspect of the present invention per se.

A yet further aspect of the present invention relates to a summarised data reconstructer which is operable to provide a (generally lossy) reconstruction of summarised data for a specified time interval, comprising a receiver for receiving an indication of an interval of time of interest for which data is required and optionally an indication of the attributes of interest; a bin identifier for identifying the or each summary bin that is relevant to the received interval of time of interest; an aggregator for, in the event that more than one summary bin is identified by the bin identifier, aggregating the identified summary bins; and an extractor for extracting from the summary bin, or from the summary bins after aggregation where the bin identifier identified more than one bin, attribute values. The extractor may perform some processing of the raw values in order to account for the duration of the interval of time of interest versus the size of the respective bin. For example if the reconstructor is aiming to obtain the amount of time spent by a user viewing news programmes between 16:00 and 17:00 and the only bin, available covering this period is a four hour bin it may be appropriate to extract the value for the amount of time spent viewing news programmes during the entire 4 hour bin period and then divide this value by 4 to obtain an approximation of the amount watched during the requested period (i.e. between 16:00 and 17:00); where the requested interval of time of interest falls within or overlaps a period of time for which two adjacent bins both have some shared membership/association (e.g. the fuzzy overlap period between two adjacent bins) the aggregator preferably aggregates both such bins to generate an aggregated bin and then may consider multiplying the or each summarised attribute value of interest by the ratio of the duration of the interval of time of interest to the duration of time covered by the aggregated bin (e.g. if an interval of time of interest was 15:00-16:00 and there was a one hour bin designatable as (15:00/0, 16:00/1, 17:00/0) and a four hour bin designatable as (11:00/0, 12:00/1, 15:00/1, 16:00/0) then these two bins could be aggregated to a five hour bin designatable as (11:00/0, 12:00/1, 16:00/1, 17:00/0) and the value of an attribute summarised within the aggregated bin could be reduced by multiplying by ⅕ to obtain an estimate of the value for the one hour interval from 15:00-16:00.

Where no indication of desired attributes is given (or in embodiments in which the reconstructer is not designed to receive and process an indication of desired attributes) it is preferable if some default set of attribute values is given which may be user settable, or it may be predefined (e.g. comprising all stored attributes having a non-zero or non-null value, etc.).

In an alternative aspect of the present invention, there is provided a method of controlling a system, the method comprising: receiving data about the system being controlled (e.g. data input to the system, data output by the system or intermediate data generated by the system as a result of some processing of input data, etc.); associating the received data with a time factor (e.g. a timestamp or a time interval, etc.); generating or updating a set of summary bins and storing the associated values thereof within a suitable data store (preferably computer data store such as a suitable random access memory), each of which summary bins is associated with a respective period of time, and each of which stores a summary of the received data associated with its respective period of time; processing the summary bins; and generating and issuing control instructions to the system being controlled based on the results of the processing of the summary bins; wherein the periods of time associated with respective summary bins include overlapping periods of time and periods of time having different durations.

Further aspects relate to computer processor implementable instructions for causing a processor to carry out the methods of aspects of the present invention, and to carrier media, most preferably non-transient carrier media, carrying such instructions. Preferably the non-transient carrier media include one or more of the following: magnetic or optical storage disks (e.g. a magnetic hard-drive, or a CD ROM or a DVD etc.) or a volatile or non-volatile solid state memory device (e.g. a RAM chip, an EEPROM, an SSD drive, a USB thumb drive, etc.).

BRIEF DESCRIPTION OF THE FIGURES

In order that the present invention may be better understood, embodiments thereof will now be described, by way of example only, with reference to the accompanying drawings in which.

DETAILED DESCRIPTION OF SPECIFIC EMBODIMENTS

Figure 1:
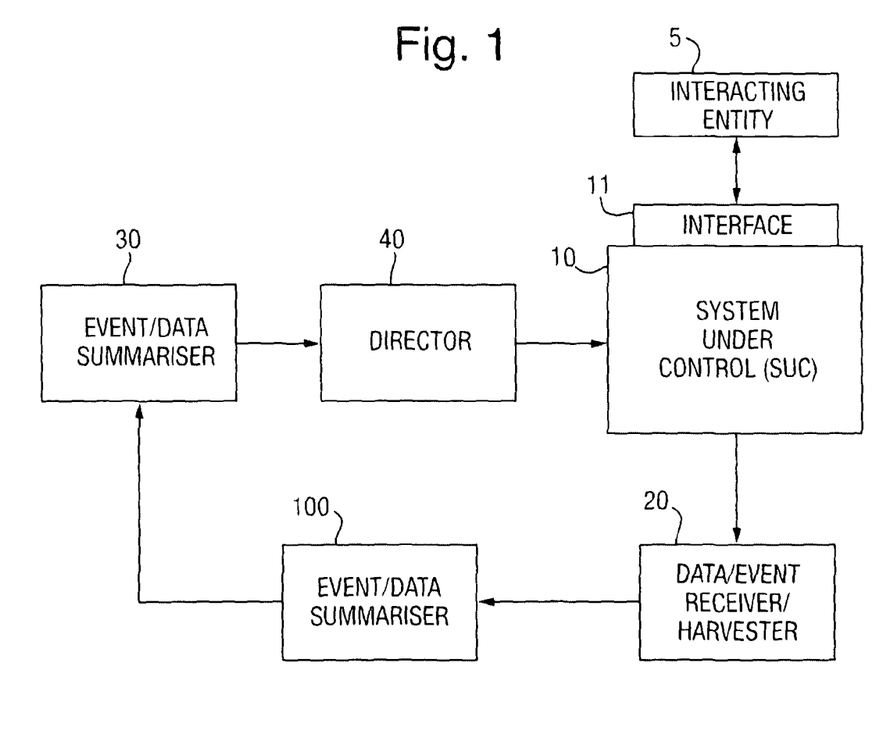
FIG. 1 is a schematic block diagram of a set up comprising a system under control and components forming a first embodiment of the present invention for controlling the system under control.

FIG. 1 is a schematic overview of an arrangement 1 incorporating an embodiment of the present invention. The arrangement includes an interacting entity 5, a System Under Control (SUC) 10 having an interface 11 with which it interacts with the entity 5, a Data/Event Receiver/Harvester 20 which receives data (normally, in the present embodiment, event data) from the SUC 10 and forwards this to an Event/Data Summariser 100 which summarises the data forwarded to it by the Data/Event Receiver Harvester and stores the summarised data. Additionally, the arrangement includes an Entity Categoriser 30 for categorising the entity 5 (once the categoriser has been suitably trained); the entity categoriser 30 may also perform other functions involving processing the summarised data generated and stored by the Summariser 100. Finally, the arrangement 1 includes a director 40 for issuing control instructions to the SUC 10 based on the categorisation of the entity 5 by the Categoriser 30.

In the present embodiment, the SUC 10 is a set-top box (and associated television); the interacting entity 5 in this arrangement is a user (i.e. a television viewer) and the interface 11 comprises a remote controller device which the user uses to control the set-top box and thus the television. In this embodiment, the set-top box is able to present different interfaces (i.e. to present information onto the television, and to determine how commands—e.g. from soft keys such as the coloured buttons commonly found on television and set-top box controllers, etc.—from the remote controller device are interpreted, in different ways) depending upon the category of user controlling the device, in particular different interfaces can be presented to users categorised as being children compared to users categorised as being adults. Furthermore, in the present embodiment, users categorised as adults can be further sub-categorised as being interested in a number of different categories of entertainment (e.g. football, politics, tennis, etc.) and the behaviour of the device can be further modified based on the sub-categorisation of a particular adult (e.g. in order to pre-emptively record certain television programmes based on the categorisation of a user of the SUC 10 and to present to the user that such programmes have been recorded—or to highlight the system's intention to record certain programmes in the future based on the categorisation, etc.).

In the present embodiment, the entity categoriser 30 is a centralised platform which takes data from (and provides data to) a large number of user's via a network connection to the Internet. However, in alternative embodiments the Entity categoriser could be a purely local device/platform.

Figure 2:
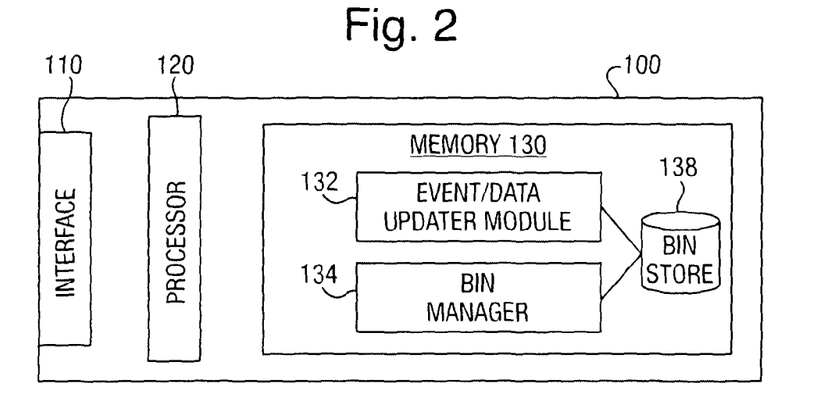
FIG. 2 is a schematic block diagram of the event/data summariser component of the embodiment shown in FIG. 1.

Turning now to FIG. 2, the Event/Data Summariser 100 is shown in greater detail. As shown, the Summariser 100 comprises an interface 110 for communicating with the Data/Event Receiver/Harvester 20 and the Categoriser 30; a processor arrangement 120 and a memory 130 for storing data and processor implementable instructions (i.e. program modules) for causing the summariser to perform various functions described in greater detail below. In addition to standard program modules required for the summariser to operate (e.g. an operating system including communication—i.e. networking—functions, etc.), the memory 130 additionally stores computer code for implementing an event/data updater, module 132, computer code for implementing a bin manager module 134 and a data store 138 in which the bin data itself is stored.

As will be described in greater detail with reference to FIG. 5, the bin manager module 134 is responsible for generating new bins as and when they are needed, for deleting old bins when they are no longer needed and for keeping a record as to what bins are currently stored in the bin store 38. The event/data updater module 132, as will also be explained in greater detail below with reference to FIG. 5) is responsible for actually updating the contents of bins based either on newly received data/events or because of a need to transfer the contents of one bin to another (e.g. because of a merger of several fine grain bins into a coarser grain bin, etc.).

Figure 3:
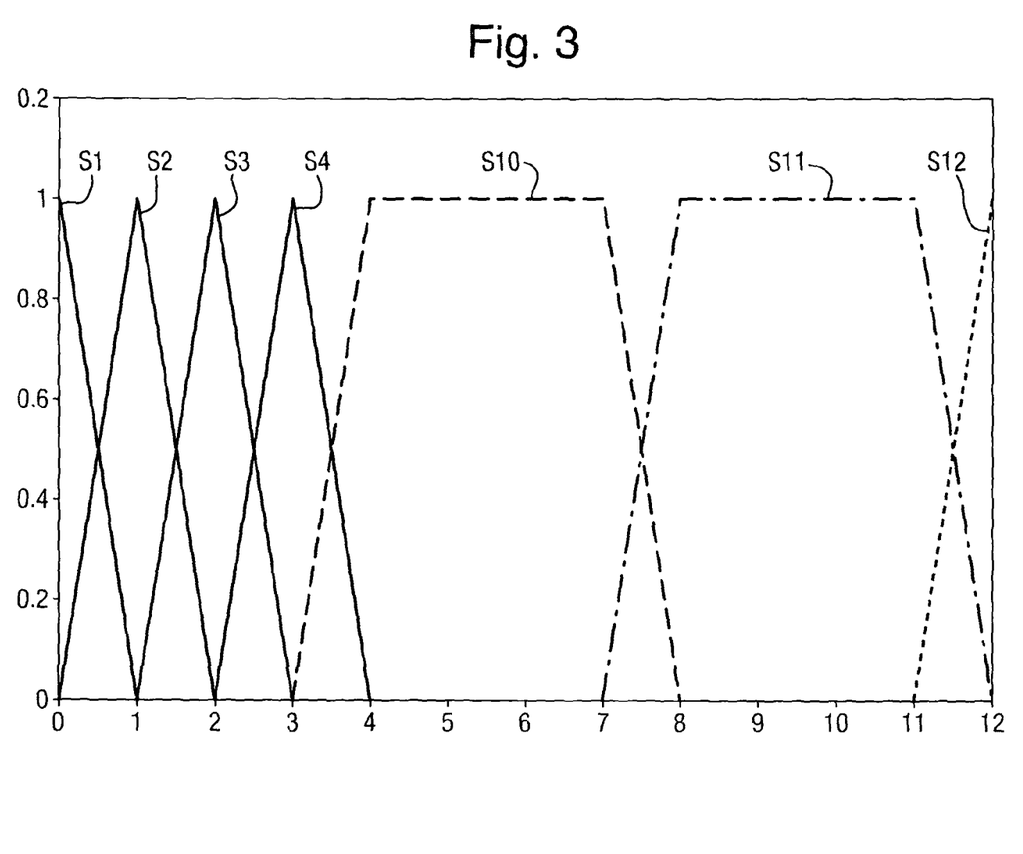
FIG. 3 is a graph of membership value (Y-axis) against elapsed time (X-axis) illustrating several example summary bins.

Turning now to FIG. 3, the summary bins used in the present embodiment are associated with periods of time in a "fuzzy" manner, meaning that a point in time can be associated with a particular bin with a membership of between 0 and 1. In a crisp bin, a point of time is either associated with a bin, or it is not corresponding to a fuzzy membership of exactly 0 or 1 respectively. In a fuzzy bin there may be points in time which are associated with a particular bin of membership values between 0 and 1 such as 0.5, etc. In FIG. 3 seven different bins are illustrated S1, S2, S3, S4, S10 and S11 (and the start of bin S12). The first bin S1 is associated with the present time ("now" is denoted $t=0$) with a membership of 1. The membership value of times after $t=0$ falls linearly with increasing time up to $t=1$ (representing a time of one hour in the past from now) at which point the membership to bin S1 is zero (as it is for all times more than one hour in the past from $t=0$). According to nomenclature adopted throughout this specification, bin S1 is designated as ($t=0/1$, $t=1/0$) which means that the membership of times to bin S1 falls from a membership of 1 at $t=0$ to a membership of 0 at $t=1$.

The second bin, S2, is designated as ($t=0/0$, $t=1/1$, $t=2/0$) which means that the membership of times to bin S2 rises from 0 at $t=0$ to 1 at $t=1$ and then back to zero again at $t=2$. Thus, for example, the time $t=0.5$ has a 0.5 membership to S1 and a 0.5 membership to S2—i.e. it is shared equally between S1 and S2.

S3 and S4 are designated as ($t=1/0$, $t=2/1$, $t=3/0$) and ($t=2/0$, $t=3/1$, $t=4/0$) respectively.

S10 is a four hour bin (in the sense that the interval of time having an association with S10 of 0.5 or greater is the four-hour interval between 3.5 hours in the past and 7.5 hours in the past) which is designated as ($t=3/0$, $t=4/1$, $t=7/1$, $t=8/0$) which means that the membership of times to bin S10 rises from 0 at $t=3$ to 1 at $t=4$, remains at 1 between $t=4$ and $t=7$, and then falls back from 1 at $t=7$ back to zero again at $t=8$. S11 and S12 (of which we can only see the first hour from 11-12) are designated as ($t=7/0$, $t=8/1$, $t=11/1$, $t=12/0$) and ($t=11/0$, $t=12/1$, $t=15/1$, $t=16/0$) respectively. Thus the time $t=11.5$ is shared equally in its association with bins S11 and S12.

Figure 4:
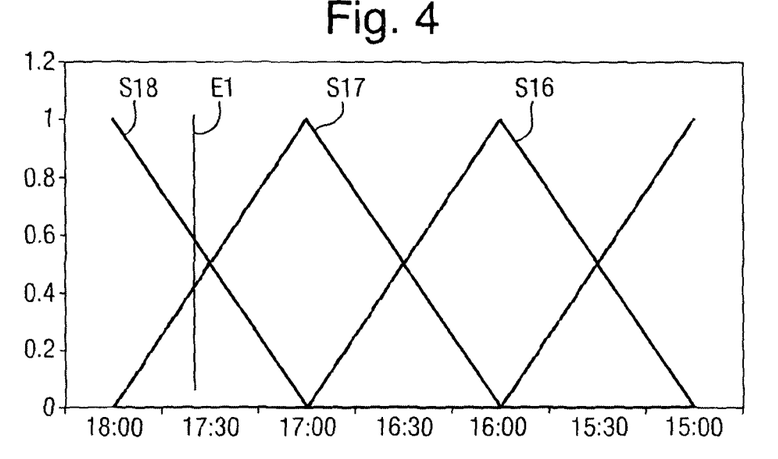
FIG. 4 is a graph similar to that of FIG. 3 showing membership value (Y-axis) against absolute time (X-axis) illustrating two complete one-hour bins and a half only of two (different) one hour bins.

FIG. 4 is similar to FIG. 3 in that it shows membership values of different points in time to a number of summary bins S16, S17 and S18. In addition it also shows the starting time of an event E1 (indicated by the vertical line designated E1 in FIG. 4). Unlike in FIG. 3, however, in FIG. 4 the summary bins are associated with fixed periods of time (rather than relative to a constantly moving "now" time). The present embodiment uses static bins as shown in FIG. 4 rather than relative ones. This means that the contents of bins needs to be modified less often than when using relative bins (when using relative bins, each time that a bin's contents are updated to reflect a new event, because time has moved on since the last update, all of the contents of the summary bins are out of date and need updating to reflect that $t=0$ has changed—i.e. a portion of each of the bins needs to be shifted along to reflect the new periods of time covered by the bins).

In the case of FIG. 4 (and where only the start time of an event is used to determine which bins need to be updated to take into account the new bin), the Event 1 is shared between bin S18 (with 0.6 membership value) and bin S17 (with 0.4 membership value). If the event was the watching of a programme and the attribute to be tracked by the summary bins is the keywords of watched programmes, then if the original content of S18 before updating to account for event E1 was {wordA/1.4, wordB/2.0, wordC/0.2, wordD/1.2} and if the keywords associated with the programme associated with event E1 were {wordB and wordD} then the updated contents of bin S18 would be (wordA/1.4, wordB/(2.0+0.6), wordC/0.2, wordD/(1.2+0.6))={wordA/1.4, wordB/(2.6), wordC/0.2, wordD/(1.8)}. Similarly the counts of wordB and wordD in bin S17 would be increased by 0.4 to reflect the effect of event E1. In other words, the contents of an event associated with a time $t_e$ are shared between the bins with which that event is associated by virtue of the value of $t_e$ in accordance with the membership of the time $t_e$ to the bins in question. Thus the total count of wordB and wordD in total over the overlapping bins S17 and S18 would be increased by one each (which accurately reflects the contents of the event being recorded—albeit that it is just being recorded in summary form).

The extension of this idea to events associated with a time interval rather than a single point in time is straightforward. One simply needs to consider the average membership of all times within the interval in question. This can be calculated by evaluating the definite integral of the membership value over the interval in question and then dividing this by the duration of the time interval in question and is trivial where the membership function is either constant or varies only linearly with time as in the present embodiment. Furthermore, the semantic unification techniques discussed above are equally applicable to use with time intervals—an interval is just a special case of a fuzzy set.

Figure 5:
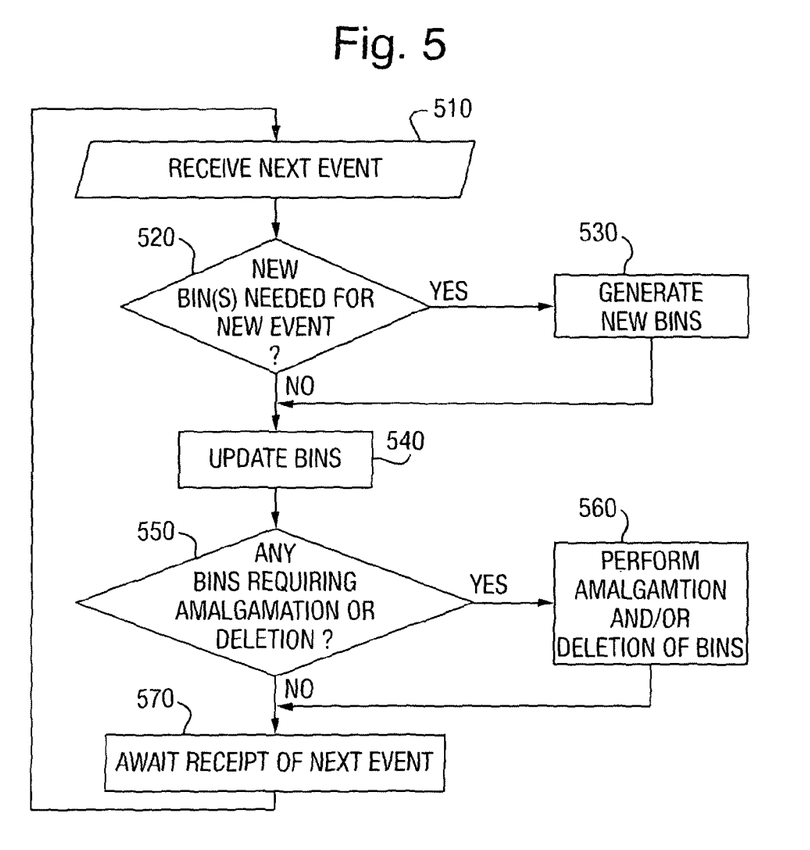
FIG. 5 is a flow chart of the steps performed by the event/data summariser component of FIG. 2 when it receives information about a new event/piece of data.

Referring now to FIG. 5, the process performed by the summariser 100 of the present embodiment will be discussed. Before discussing the individual elements of the process with reference to FIG. 5 in detail however, the overview of the process performed in the arrangement 1 of FIG. 1 in the present embodiment will firstly be described.

Thus, in the present illustrative embodiment (demonstrating only one relatively simple function for the purposes of illustrating the present invention, it being straightforward to realise from the present embodiment how the functionality could be greatly extended in alternative commercial embodiments), is a set top box (such as a BT Vision box) and associated television apparatus. The data/event receiver/harvester 20 comprises software running on the set-top box which generates log data about the actions of the user. In the present embodiment this software has access to an Electronic Programme Guide (EPG) and is operable to extract from the EPG meta keywords associated with a programme determinable based on actions performed by the user—e.g. if the user switches via the set-top box to a channel, the capture software obtains meta keywords for the programme scheduled to be showing at that time on the selected channel according to the EPG (the meta keywords coming from the text description of the scheduled programme from the EPG)

and passes these to the Summariser in the form of an event record specifying the time interval for which a particular channel was selected on the set-top box for sending to the television and the associated keywords. Additionally, in the present embodiment, the capture software additionally obtains a genre description meta word from the EPG and also passes this to the summariser as part of the event record. The event is deemed to end when either the set-top box is switched off or the scheduled programme ends. In the present embodiment an event record is finalised and sent to the summariser 100 only when the event is deemed to have ended (however in alternative embodiments an event record could be generated as soon as a new event is detected to have occurred—e.g. on a new programme starting or on the user switching to a new channel). In the present embodiment, if one programme ends and a new one begins without the user changing channel a new event record is created for the new programme (with a new event start time and a new set of meta keywords). In an alternative embodiment however, a new event is only created as a result of a user interacting via the user interface to select a channel positively (so as to discount the possibility that a user has ceased watching the television without switching off the set-top box and/or television—e.g. because the user has left the room or fallen asleep, etc.—further variations are possible where for example after a predetermined period of time (e.g. one hour) without any interaction from the user via the user interface it is assumed that the user has stopped watching an no further events are generated after that time (even if one programme ends and another begins)).

Once an event record has been finalised it is passed to the summariser 100 which then processes it in the manner described below with reference to FIG. 5. Thus, at step 510, when an event record is passed to the summariser 100 it commences the bin update process illustrated in FIG. 5 and the operational flow proceeds to step 520. At step 520, it is determined whether or not new bins are required to be formed. This would be the case, in the present embodiment, if, for example, the time associated with the most recent received event record has reached a value where it has (or perhaps rather should have) some membership with a bin which has not yet been created. For example, referring to FIG. 4, if a new event record were received in respect of a new Event E2 having an associated time of 18:12, then the Summariser 100 at step 520 would determine that a new bin S19 (designatable as (18:00/0, 19:00/1, 20:00/0)) should be created since 18:12 has a membership of 0.2 to such a bin. Similarly, in the present embodiment, a new four hour bin is created whenever there are 8 (or more) one-hour bins. Thus, if, for example, bins S12, S13, S14, S15, S16, S17 and S18 were in existence before the record for event E2 was received, the creation of bin S19 would result in there being 8 one-hour bins in existence and therefore a new four hour bin S1215 (not shown) designatable as (11:00/0, 12:00/1, 15:00/1, 16:00/0) would be created into which the four one hour bins S12 to 515 will be merged at step 560 (described below).

Once all necessary new bins have been created, the method proceeds to step 540 in which an update of the bins is performed. Updating the bins basically comprises sharing the contents of an event record or records amongst the bins which are relevant to the event(s) based on the timings of the event(s). For example, in the present embodiment, an event record comprises a start time, a series of keywords and a genre descriptor. Each bin contains a list of keywords and an associated frequency of occurrence of each keyword within the time covered by the bin (hereinafter referred to as a "bag of words"), a genre descriptor and a frequency of occurrence of that genre descriptor within the time covered by the bin and a time of day descriptor and a part of week descriptor (and associated frequency of occurrence of events associated with those time of day and part of week descriptors—note, in the present embodiment, each record is assigned to one of four time of day categories (morning, afternoon, evening, night) and to one of two part of the week categories (weekday, weekend)).

Updating a bin comprises adding to the frequency of each keyword and descriptor stored in the bin a proportion of each keyword and descriptor associated with the event, the proportion being determined based on the membership level to the bin of the start time of the event. Thus if, for example, the record for event E2 contained keywords {football, Premier, Manchester}, genre descriptor Genre_Sport, and start time 18:12 on Tuesday 8 Nov. 2011, it would be associated with time of day and part of week descriptors time of day "evening" and part of week "weekday" and if for example bin S18 comprised {Genre_Sport/2.8; ToD_Evening/2.8, PoW_WeekDay/2.8, football/2.8, Premier/1.4, Championship/1.4, Arsenal/1.4, West Ham/0.8, Derby/0.6}before the record for event E2 was received, then upon completion of step 540 bin S19 (which has just been created and is thus entirely empty to begin with) would contain {Genre_Sport/0.2, ToD_Evening/0.2, PoW_WeekDay/0.2, football/0.2, Premier/0.2, Manchester/0.2} and S18 would contain {Genre_Sport/3.6, ToD_Evening/2.8, PoW_WeekDay/3.6, football/3.6, Premier/2.2, Championship/1.4, Arsenal/1.4, West Ham/0.8, Derby/0.6, Manchester/0.8}.

Upon completion of step 540 the operational flow proceeds to step 550 where the Summariser 100 determines if any bins need to be amalgamated (or otherwise merged into one or more other bins) and/or deleted. Generally, a positive determination is made here when a number of fine grain older bins are to be amalgamated in a single new coarser grain bin. For example, in the case described above where a new event record (for new event E2) has caused the new four hour bin S1215 to be created, the contents of the four one hour bins S12 to S15 are to be amalgamated into the new coarser bin S1215. Once the amalgamation has been performed, the one hour bins are then deleted. In addition, in some embodiments very old bins may simply be deleted without amalgamating their contents into a different coarser grain bin if the information has become so old as to be of no further use (e.g. bins over one year old may be considered to be of no further use in ascertaining a user's current viewing preferences). Alternatively new coarser bins could just continually be created, or a final bin could just have its range continually expanded to include all data beyond a certain age, etc. effectively swallowing up the oldest most coarsely grained bins as they expire.

If at step 550 it is determined that there are some bins requiring amalgamation and/or deletion, then the operational flow proceeds to step 560 in which the actual amalgamation and/or deletion of bins is performed. In the present embodiment, and continuing with the example specified above involving the newly received event record for E1 and the newly created bins S19 and S1215, the contents of the four one hour bins to be amalgamated, S12 to S15, are summed together to form the contents of the new four hour bin S1215 and then the four one hour bins are deleted. A small discussion of alternative scenarios requiring more complicated amalgamation processes is provided below after finalising the discussion of FIG. 5.

If at step 550 it is determined that no amalgamation is required, or upon completion of step 560 (if it was determined that amalgamation was required), the method proceeds to step 570 in which receipt of a new event is awaited. Once a new (or next) event is received, the method loops back to step 510 and the method repeats.

As mentioned above in the discussion of step 560, the amalgamation of smaller time scale bins into larger time scale bins can be more complicated if the slopes of the smaller bins to be amalgamated into a bigger bin do not overlap exactly. In fact the above described process of simply adding the contents of the bins is not strictly correct even in respect of the simple case where the fuzzy slopes of the smaller bins overlap exactly with the fuzzy edge slopes of the bigger bin into which the bin is to be amalgamated and in fact a small proportion of the contents of the edge smaller bins should actually be contributed to an adjacent larger bin which overlaps the new larger bin. For example, continuing the example of FIG. 4, consider a four hour bin S0811 designatable as (07:00/0, 08:00/1, 11:00/1, 12:00/0) and the one hour bin S12 (designatable as (11:00/0, 12:00/1, 13:00/0))—between 11:00 and 12:00 these two bins overlap each other and the overlap means that some portion of S12 should actually go to S0811 with the remainder only going to S1215. Of course, in this case the portion of S12 that should be contributed to S0811 equals the portion of S11 that should be contributed to S1215 and so by instead contributing all of S11 to S0811 and all of S12 to S1215 the process is made simpler (if slightly less correct).

The more correct manner of performing the apportionment of the content of small bins to larger bins will now be described below by way of a more complex example.

When a smaller bin is to be absorbed into a larger bin, there are two possibilities
  (i) smaller bin is completely inside the portion of the larger bin associated with times which are associated with the larger bin with a membership of one—in which case the contents of the smaller bin are simply added to the larger bin;
  (ii) smaller bin overlaps a portion of the larger bin at a time (or a period of time) whose membership to the larger bin is between one and zero. In this case, a proportion of the smaller bin's content is added to the larger bin.

The proportion is found using the process of semantic unification—a conditional probability for fuzzy sets, well documented in various academic papers and books including, for example, "The Conditional Probability of Fuzzy Subsets of a Continuous Domain." by J. F. Baldwin, J. Lawry and T. P. Martin in "Fuzzy Sets and Systems 96" pp 211-222 (1998).

Figure 6A:
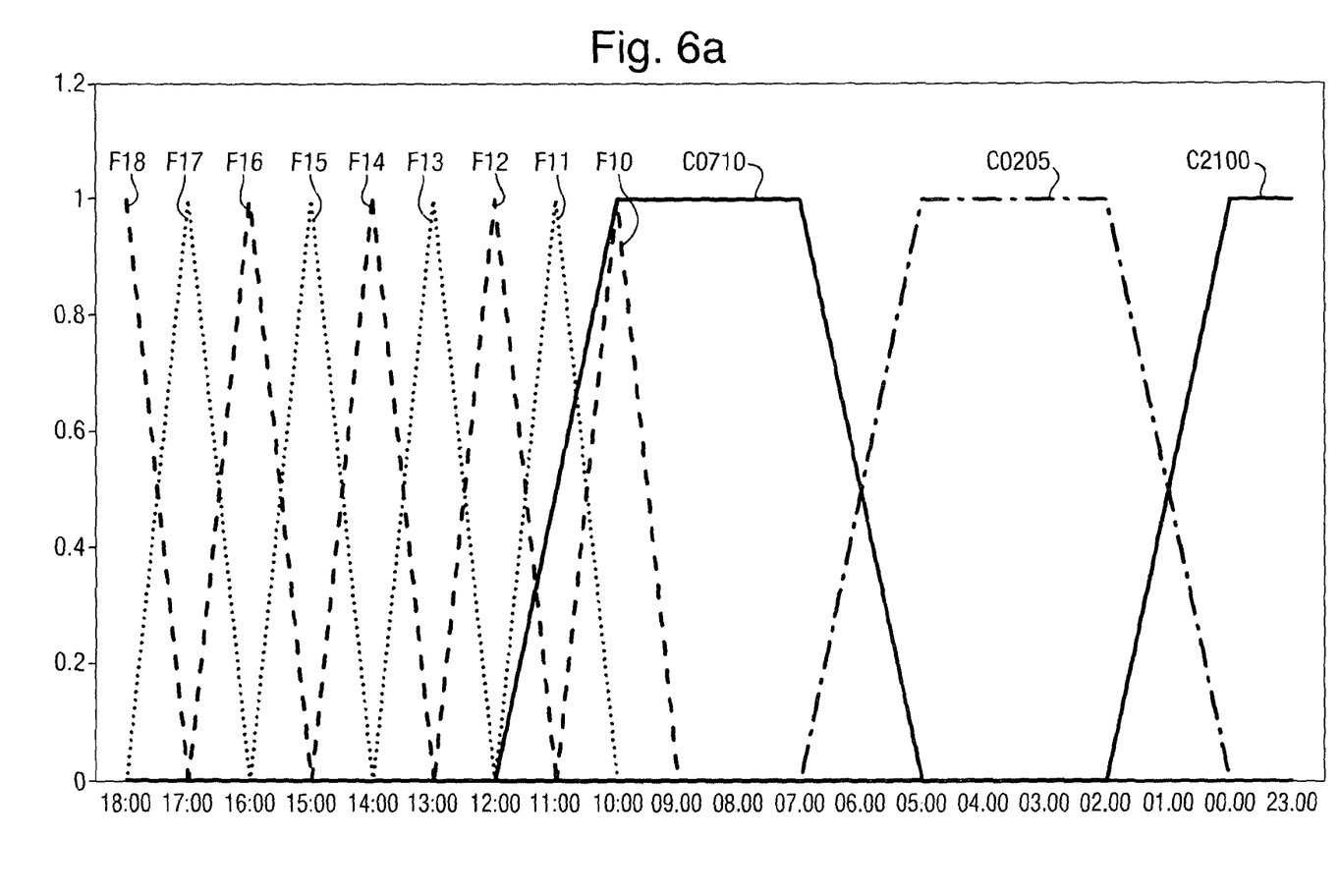
FIGS. 6a and 6b are graphs of membership value against time which are similar to those of FIGS. 3 and 4 and which show the effect of amalgamating four one hour bins to form a new four hour bin.
Figure 6B:
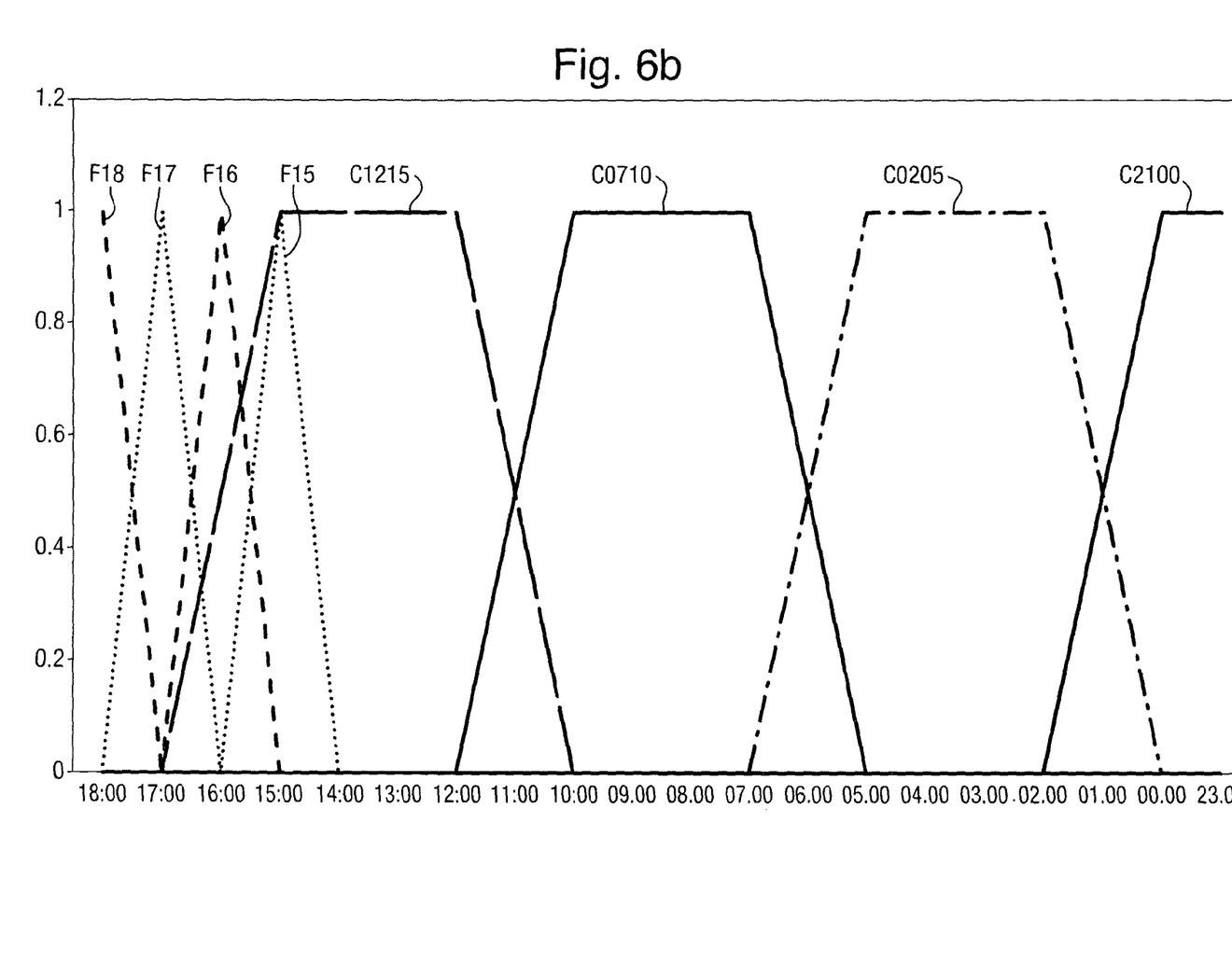

To illustrate the process, the one hour, fine grain, fuzzy bins centred about 18:00, 17:00, 16:00, ... are designated as $F_{18}, F_{17}, F_{16}$ ... and the coarser, five hour bins (repeating on a five hourly basis and having a membership of 0.5 or greater for five hours), having time memberships of value one between 07.00 to 10:00, 03:00 to 06:00, ... are designated as $C_{0710}, C_{0306}$, etc respectively, and are shown in FIG. 6a. Note that the coarser bins have a fuzzy slope which decays from one to zero over a two hour time period (e.g. from 10:00 to 12:00) while the fine bins have fuzzy slopes which decay from one to zero over just a one hour period. FIG. 6b then illustrates the situation after bins $F_{10}, F_{11}, F_{12}, F_{13}$, and $F_{14}$ have been "amalgamated" into a new five hour bin $C_{215}$.

In order to generate/amalgamate several one hour fine grain bins into a new coarse grain bin $C_{1215}$, the content of $C_{1215}$ is calculated according to:

$$S(C_{1215}) = \Sigma_{i=10}^{17} S(F_i) \cdot Pr(C_{1215}|F_i)$$

where $Pr(C_j|F_i)$ is determined by integrating the product of $C_j$ and $F_i$ over the duration of F and normalising this to form a proportion (of the total contents of $F_i$) by dividing by the integration of $F_1$ (over the duration of $F_i$ having a non-zero time membership value) (which is equal to one for the fine grain $F_i$ bins). In this case, the above procedure results in the following proportions of the fine scale bins to be allocated to coarse bins $C_{1316}$ and $Co_{0710}$ respectively:

|  | $C_{1215}$ | $C_{0710}$ |
|---|---|---|
| $F_{10}$ | 0.06 | 0.94 |
| $F_{11}$ | 0.5 | 0.5 |
| $F_{12}$ | 0.94 | 0.06 |
| $F_{13}$ | 1.0 | 0.0 |
| $F_{14}$ | 1.0 | 0.0 |
| $F_{15}$ | 0.94 | 0.0 |
| $F_{16}$ | 0.5 | 0.0 |
| $F_{17}$ | 0.06 | 0.0 | i.e. the proportion of $F_{12}$ assigned to coarse bin $C_{1215}$ is 0.94 or 94% and the proportion assigned to $C_{0710}$ is 0.06 or 6%, which can be expressed mathematically as $Pr(C_{1215}|F_{12}) = 0.94$.

NB it is preferable for convenience of calculation etc. to arrange that the fuzzy sets $F_{10}, F_{11}$, etc and $C_{1215}, C_{0710}$, etc. form partitions over the appropriate ranges, i.e. that the total memberships of $F_i$ at any point of time in the range covered by the fine bins sums to one and similarly for the total memberships of the coarse bins.

Note also that the remaining proportions of $F_{15}, F_{16}, F_{17}$ will be absorbed into the next coarse fuzzy bin created ($C_{1720}$).

Thus, based on the above description, it is clear how summary bins can be created and updated for each newly received event in order to build up a set of bins of increasing coarseness as time progresses. As mentioned much earlier in the specification, there is no real limit to either how many bins can be stored, or how coarse the more coarsely grained bins can become. For observing viewers' television viewing behaviour, using annual bins as the most coarsely grained bins is probably more than sufficient.

The question then arises as to how to use these summary bins, which are created in the manner described above, in order to categorise the behaviour of an individual user and to make customisations to the behaviour of the set top box (in the present example) in order to tailor the behaviour of the device to the user in question. As mentioned above, the basic operation to be performed in the present example is to categorise the user to one of a plurality of categories of viewer types and then to attempt to predict which newly broadcast items may be of interest to the user based on the categorisation of the user in some way and to proactively record such programmes without an explicit action being taken by the user to record such a programme, so that the viewer has the option to watch this programme at a later date in the event that the user inadvertently "missed" the programme (e.g. because he/she was unaware of the programme). Of course, this is just one example of the type of customisation of the behaviour of a device which can be performed based on the generic process of capturing and efficiently summarising user interaction data, processing the data to identify possible preferences of the user and then customising the device's behaviour in accordance with those identified possible preferences.

In the present embodiment, the process adopted is to firstly categorise the user's behaviour based on its similarity to other users' pre-categorised summarised interaction data, and then to provide a comparison of data categorising programmes due to be broadcast shortly with data identifying various user categories and to make a decision of whether or not to proactively record such programmes based on the result of the comparisons.

In order to set up categories in the first instance, some training data is provided to a data clusterer system within the Entity Categoriser 30 in the form of the summary bins of four weeks' worth of each of a plurality of users' viewing data (in the form of 4 one-week summary bins for each user—note that the most recent data may not have been already amalgamated into a one week bin; however, if the Event/Data Summariser 100 has enough information (e.g. stored in finer granularity bins) to fill a full one week bin summary, then the Event Data Summariser simply generates by amalgamation (without necessarily deleting the fine granularity bins though) a new one-week bin for use by the entity categoriser 30). The clusterer system then forms clusters of the week long bins (e.g. using a k-means clustering algorithm as in the present embodiment, though of course alternative clustering algorithms could be employed in different embodiments) and a human user appends category titles to each of these clusters (e.g. a cluster of one week summary bins all of which include a lot of football viewing may be categorised by the human administrator as belonging to a category of "interested in Football", etc.). The human user/administrator is also required to specify certain parameters for use by the clustering system (e.g. specifying a value for k as to the number of different clusters to be formed from the raw data, specifying weightings to be applied to different keywords/descriptors, etc.).

In the present embodiment, the clusters are formed by basically considering each summary bin as a vector within a (large) multi-dimensional space (having as many dimensions as there are different keywords and descriptors within the complete set of one-week summary bins), where the frequency value of each keyword/descriptor (possibly after applying a weighting specified by the user/administrator of the Entity Categoriser 30) is considered as a component (distance) value and then the clustering algorithm forms clusters based on the distances between the vectors.

Having then formed clusters in this way, a centroid vector for that cluster is created for each such cluster (in the present embodiment, these centroid vectors are formed as part of the K-means clustering algorithm in any event). Once the centroid vectors have been created in this way, it is possible to calculate a distance between each such centroid vector and a new unclassified vector such, for example, one formed from an EPG description of a programme to be broadcast. It is possible that some sort of normalisation might be appropriate (such that the direction of the vectors is more important than their magnitude since the frequency numbers of say genre descriptors of one-week summary bins may be much greater than unity whereas a single programme vector is likely to have frequency values of zero or one for each genre descriptor) before attempting to categorise an EPG description of a programme based on centroid vectors formed from one-week summary bins but this may not be necessary in some cases.

Having thus categorised each of the users and each of the programmes to be broadcast, the user categorisations and details of programmes similarly categorised can be passed to the director 40 to determine what actions (if any) should be taken based on these categorisations. In the present embodiment, the Entity Categoriser 30 additionally associates with each programme to be broadcast a general rating (e.g. of from 1 to 5 based on predicted general popularity e.g. as provided by a human television reviewer) and this information can be used in addition to the programme categorisations to filter out some programmes which match the particular user's categorisation (e.g. the Director 40 may choose to instruct the system under control (i.e. the set top box in the present example) to only pre-emptively record programmes which are categorised as belonging to the same category as that to which the user has been categorised AND which have a general popularity rating of 3 or higher for example. In any event, based on settings, which may be user or operator (e.g. the network operator or the service provider associated with the set top box) configurable, and categorisation data provided by the entity categoriser 30, the Director 40 determines actions to be taken by the system under control 10 in order to customise its behaviour/performance to suit the user 5.

Mathematical Exposition of Summarisation Process

A mathematical description of the more general process of summarising data according to embodiments of the present invention is now set out below:

We assume that (i) data can be represented in a table form (object-attribute-value), updated at regular or irregular intervals. Table form may be a standard relational database, or a less formal storage method. We represent this below as A(o, t)=v, read as attribute A of object o has value v at time t.

(ii) Attributes (or groups of attributes) have associated methods for summarising their values, such as means, frequency distributions, association confidence (between attributes), etc. These methods allow attribute values (or a fraction of an attribute value, in the case of fuzzy membership) to be included or removed. For example, the arithmetic mean of (1, 2, 3, 4, 2, 3, 1, 4) is 20/8=2.5 Including another value 4 would change the mean to 24/9=2.667, removing values 1 and 2 would change the mean to 21/7=3. We represent this below as S(A, O, T) where S indicates the summarising function, A is one or more attributes, O is one or more objects and T is a time or time range. We use the symbols $\oplus$ and - to indicate inclusion and removal of values, but emphasise that this notation does not represent arithmetic addition and subtraction. We also use the symbol $\otimes$ to denote a fraction of the summarising value; the method of finding such a fraction is dependent on the attribute (iii) categories are used to group objects together, each object may belong to more than one category and membership may the given in yes/no form or as a degree of membership. New categories may be added at any time, and existing categories may be changed or deleted. A category denotes a set of objects (possibly a fuzzy set).

(iv) Each category has a membership template defined in terms of the attribute values representing conditions for membership—such definitions might use ranges of values, overlaps with sets of values, relations between different attributes, or more complex matching functions that compare an attribute value or summary with the template.

(v) each category returns true/false (or a fuzzy membership) for any object or set of objects; furthermore, each category can give a measure of its own coherence (i.e. an indication of how closely its members are related) and of its degree of overlap/distance from another category.

(vi) Time is split into a series of overlapping fuzzy segments, of varying size (granularity). We can think of these as fuzzy bins, linked together in a series; additionally, each series is part of a nested sequence of increasingly coarse granularity. For example, we might split the last 12 hours into four overlapping fuzzy categories designatable as $F_{11}=(0/1, 3/1, 5/0)$, $F_{12}=(3/0, 5/1, 6/1, 8/0)$, $F_{13}=(610, 8/1, 9/1, 11/0)$, $F_{14}=(9/0, 11/1, 12/1, 14/0)$ and the last 48 hours into four hour long fuzzy categories designatable as $F_{21}=(0/1, 12/1, 18/0)$, $F_{22}=(12/0, 18/1, 24/1, 30/0)$, $F_{23}=(24/0. 30/1, 36/1, 42/0)$, $F_{24}=(36/0, 42/1, 48/1, 54/0)$.

Each summarising function is calculated within each of the fuzzy intervals; by choosing a finer granularity for recent intervals and a coarser granularity as we go back further in time, recent data can be reproduced more accurately than older data. This is illustrated for a simple time series and for a keyword histogram below.

Mosaic System Outline

The following pseudo code illustrates in overview the process to be performed in summarising a new incoming data item, $D_k$, associated with a time, $t_k$, where $t_k$ is the time (expressed for example in hours) between the time, to, at which the summarising system was initiated and the present time (with which the data item $D_k$ is associated).

---

Initialise fuzzy bins; these are initially inactive, except for those having non---zero membership for time t=0.
Initialise summarisers for each attribute (or attribute combination) in each active fuzzy bin.
repeat
    for each incoming piece of data, $D_k$ (at time $t_k$);
        update fuzzy bins;
    end;
    at appropriate intervals, check category coherence and update categories;

---

Process to Update Fuzzy Bins (with Data Dk at Time Tk)

Mark the active fuzzy bins (those having non-null overlap with the interval $[0,t_k]$ and initialise summarisers for any newly activated bins. Find summariser S, object set O and attribute set A relevant to data $D_k$

--- for each fuzzy bin series i
    calculate update proportions $P_U$ = Pr ($F_{i1}$ | $[t_{k-1},t_k]$ );
    for j = oldest active fuzzy bin in series i down to j = 2
        S(O,A, $F_{ij}$)= S(O,A, $F_{ij}$) ⊕ ($P_{ij}$⊕ S(O,A, $F_{ij-1}$))
        S(O,A, $F_{ij-1}$)= S(O,A, $F_{ij-1}$) − ($P_{ij}$⊕ S(O,A, $F_{ij-1}$))
    end
    S(O,A, $F_{i1}$)= S(O,A, $F_{i1}$) ⊕ ($D_k$) ;
end

--- note that j is decreasing in the inner loop, and that the operations must be performed in the order shown. The value of Pr ($F_{i1}$|$[t_{k-1},t_k]$) can be found using semantic unification as described in "The Conditional Probability of Fuzzy Subsets of a Continuous Domain." by J. F. Baldwin, J. Lawry and T. P. Martin in "Fuzzy Sets and Systems 96" pp 211-222 (1998). NB this assumes that the interval $[t_{k-1},t_k]$ is completely contained within the first bin. A relatively simple extension to the calculation is required if this is not the case.

At the finest granularity of fuzzy intervals, the update includes the new value in the first fuzzy bin and shifts previously recorded values along the sequence of fuzzy bins.

At the coarser granularities, the effect is similar but is linked to the shift in values within the next finest sequence of fuzzy bins.

For each granularity level, this has the effect of (approximately) recalculating the summarising function over the original data values shifted to their new elapsed times. It is extremely quick to calculate, since it merely requires the summarising function to remove a fraction of its value and include a new value (or fraction).

Process to Recover Value from Summarised Data at a Past Timepoint $t_k$

The storage method is not lossless, so it is not generally possible to recover the original data, only an approximation to it. Where a category template is changed, it is often necessary to know the approximate value of an attribute summary at some point (or interval) in the past.

To find the value at a point in time, t, from a sequence of fuzzy bins $F_{i1}, \ldots, F_{im}$, it is sufficient to simply compute the weighted "sum" (using the ⊕ operation) either on a point-by-point basis or over an interval.

Thus, let j be the series of fuzzy bins with finest granularity where timepoint $t_k$ has non-zero membership, let n be the number of fuzzy bins in this series, and let F(t) denote the membership of t in the fuzzy bin F. Then:

$$A"(O,t_k)=F_{j1}(t_k)\otimes S(O,A,F_{j1})\oplus F_{j2}(t_k)\otimes S(O,A,F_{j2})\oplus \ldots$$
$$\oplus F_{jn}(t_k)\otimes S(O,A,F_{jn})=\oplus F_{ji}(t_k)\otimes S(O,A,F_{ji})$$

The extension to an interval $[t_a, t_b]$ is straightforward:

$$A"(O,t_k)=\oplus Pr(F_{ji}|[t_a,t_b])\otimes S(O,A,F_{ji})$$

Note that A indicates that it is the recovered value of the attribute rather than the actual original attribute value.

Example for Text Data

Let us assume a summarising function for a category C (=a subset of objects) that creates a histogram of words (bag of words style representation, ignoring word order, closeness, etc) to represent the attribute document content.

If a document D1=(w1,w2,w3,w1,w1) is added at time=$t_0$, the histogram (w1/3, w2/1, w3/1) will be stored as the summary in bin $F_1$. Let us assume that a further 11 documents D2-D12 are added at the same time, so that the summarised histogram in bin $F_{11}$ is:
S(C, content, $F_{11}$)=(w1/23, w2/21, w3/11, w4/12, w5/2) from 12 documents Now, we update with document D13=(w2,w2,w1,w2,w6) at time $t_1$.
where $Pr(F_{11}|[t_1,t_0])$=0.8 and $Pr(F_{12}|[t_1,t_0])$=0.2.
The new summarised content for $F_{11}$ is:

$$S(C, \text{content}, F_{11}) = (w1/1, w2/2, w6/1) \text{ from 1 document}$$
$$+(w1/23, w2/21, w3/11, w4/12, w5/2)$$
$$\text{from 12 documents} - 0.2 * (w1/23, w2/21,$$
$$w3/11, w4/12, w5/2) \text{ from 12 documents}$$
$$= (w1/19.4, w2/18.8, w3/8.8, w4/9.6, w5/1.6,$$
$$w6/1) \text{ from 10.6 documents}$$

and $$S(C, \text{content}, F_{12}) = 0.2 * ((w1/23, w2/21, w3/11, w4/12, w5/2)$$
$$\text{from 12 documents}$$
$$= (w1/4.6, w2/4.2, w3/2.2, w4/2.4, w5/0.4)$$
$$\text{from 2.4 documents.}$$

Variations

In the above described embodiment as illustrated in FIG. 1, the entity categoriser 30 is a network based centralised platform taking summarised data from a number of summarisers 100, whilst the remaining elements in the arrangement (i.e. the system under control 10, the data/event receiver/harvester 20, the event/data summariser 100, and the director 40 are all local elements (e.g. contained as part of a set top box (the normal set top box features of which then constitute the system under control 10) or a home hub router type device, etc.). Of course this could be varied—for example one or more of these elements (e.g. the data receiver 20, the summariser 100 and/or the director 40 could all be centralised network-based functions similarly to the entity categoriser in this embodiment. Similarly, the entity categoriser 30 could be provided locally (possibly with some general remote input e.g. to specify certain typical descriptions of predetermined categories (e.g. centroid vectors of pre-determined categories of entitles)). One function of the entity categoriser could be to automatically distinguish between different users of the same device (i.e. the system under control) so as to be able to tailor the performance of the device (e.g. the user interface—e.g. by highlighting different proactively recorded items, or simply by presenting a less detailed interface to some users than to others etc.) for different users based on a categorisation of the different users and a categorisation of current behaviour, etc. Additionally, some of these elements could be combined or split in terms of their functionality (with perhaps some parts of an element being locally situated and other parts being remotely located possibly at a central network based platform etc.).

The invention claimed is:

1. A system controller comprising:
an electronic interface configured to receive data about a system to be controlled; and
at least one processor and a memory comprising instructions, the instructions being executable by the at least one processor to at least:
associate the received data with a time factor;
update a set of summary bins, each of which covers a respective period of time, and each of which stores a summary of the received data having a time factor that falls within the respective period of time covered by the summary bin;
process the summary bins; and
issue control instructions to the system to be controlled based on results of the processing of the summary bins;
wherein the periods of time covered by respective summary bins include overlapping periods of time and periods of time having different durations; and
wherein the summary bins are fuzzy bins in the sense that where bins, having the same granularity, cover overlapping periods of time, data associated with a time falling within such an overlap is apportioned between the overlapping summary bins for summarizing purposes in accordance with fuzzy membership rules.

2. The system controller according to claim 1, wherein the updating includes generating and then updating new summary bins, and amalgamating older summary bins into one or more coarser grained summary bins as new data associated with more recent times is received.

3. The system controller according to claim 1, wherein the received data is data resulting from interactions between an unknown entity and the system to be controlled;
wherein the processing of the summary bins includes performing a categorization of the received data in order to identify a category with which to associate the entity, and
wherein the issuance of control instructions includes issuing instructions to the system to be controlled to modify its behavior in order to be tailored to the unknown entity in accordance with the performed categorization.

4. The system controller according to claim 3, wherein the system to be controlled is a social networking platform;
wherein each user of the social networking platform constitutes an unknown entity to be categorized; and
wherein the system is controllable to disable certain functionality for a particular user if the category identified by the processor disagrees with a categorization provided by the user.

5. A summarizer computer node, comprising:
at least one processor and a memory comprising instructions, the instructions being executable by the at least one processor to at least update a set of summary bins, each of which covers a respective period of time, and each of which stores a summary of some received data having a time factor associated therewith that falls within the respective period of time covered by the summary bin;
wherein the periods of time covered by respective summary bins include overlapping periods of time and periods of time having different durations;
wherein the summary bins are fuzzy bins in the sense that where bins, having the same granularity, cover overlapping periods of time, data associated with a time falling within such an overlap is apportioned between the overlapping summary bins for summarizing purposes in accordance with fuzzy membership rules; and
wherein a control instruction is issued to a system to be controlled based on results of processing the summary bins.

6. The summarizer computer node according to claim 5, wherein further instructions are executable to generate and then update new summary bins and to amalgamate older summary bins into one or more coarser grained summary bins as new data associated with more recent times is received.

7. A summarized data reconstruction computing node controllable to provide a reconstruction of summarized data for a specified time interval in connection with a system to be controlled and a system controller, the system controller including an interface configured to receive data about the system to be controlled and processing resources configured to execute a first set of instructions to at least (a) associate the received data with a time factor, (b) update a set of summary bins, each of which covers a respective period of time, and each of which stores a summary of the received data having a time factor that falls within the respective period of time covered by the summary bin, (c) process the summary bins, and (d) issue control instructions to the system to be controlled based on results of the processing of the summary bins, wherein the periods of time covered by respective summary bins include overlapping periods of time and periods of time having different durations, wherein the summary bins are fuzzy bins in the sense that where bins, having the same granularity, cover overlapping periods of time, data associated with a time falling within such an overlap is apportioned between the overlapping summary bins for summarizing purposes in accordance with fuzzy membership rules, and wherein the summarized data reconstruction computing node comprises:
an electronic receiver interface configured to receive an indication of an interval of time of interest for which data is required; and at least one processor and a memory comprising a second set of instructions, the second set of instructions being executable by the at least one processor to at least:
- identify the or each summary bin that is relevant to the received interval of time of interest;
- aggregate, in the event that more than one summary bin is identified by the bin identifier, the identified summary bins; and
- extract from the summary bin, or from the summary bins after aggregation where the bin identifier identified more than one bin, attribute values.

8. A method of controlling a system, the method comprising:
- receiving data about the system being controlled;
- associating the received data with a time factor;
- generating or updating a set of summary bins and storing the associated values thereof within a suitable data store, each of which summary bins is associated with a respective period of time, and each of which stores a summary of the received data associated with its respective period of time;
- processing the summary bins; and
- generating and issuing control instructions to the system being controlled based on the results of the processing of the summary bins;
- wherein the periods of time associated with respective summary bins include overlapping periods of time and periods of time having different durations; and
- wherein the summary bins are fuzzy bins in the sense that where bins, having the same granularity, cover overlapping periods of time, data associated with a time falling within such an overlap is apportioned between the overlapping summary bins for summarizing purposes in accordance with fuzzy membership rules.

9. A non-transient computer readable storage medium comprising processor implementable instructions that, when executed via a computer processor, cause the method of claim 8 to be carried out.

10. The method according to claim 8, wherein the generating or updating includes generating and then updating new summary bins, and amalgamating older summary bins into one or more coarser grained summary bins as new data associated with more recent times is received.

11. The method according to claim 8, wherein the received data is data resulting from interactions between an unknown entity and the system to be controlled;
- wherein the processing of the summary bins includes performing a categorization of the received data in order to identify a category with which to associate the entity, and
- wherein the issuance of control instructions includes issuing instructions to the system to be controlled to modify its behavior in order to be tailored to the unknown entity in accordance with the performed categorization.

12. The method according to claim 11, wherein the system to be controlled is a social networking platform;
- wherein each user of the social networking platform constitutes an unknown entity to be categorized; and
- wherein the system is controllable to disable certain functionality for a particular user if the category identified by the processor disagrees with a categorization provided by the user.

13. The summarized data reconstruction computing node according to claim 7, wherein the electronic receiver interface is further configured to receive an indication of the attributes of interest.

* * * * *